United States Patent
Karunamuni et al.

(10) Patent No.: US 9,678,631 B2
(45) Date of Patent: Jun. 13, 2017

(54) REORDERING CONTENT PANES IN A STACKED TAB VIEW

(71) Applicant: Apple Inc., Cupertino, CA (US)

(72) Inventors: Chanaka G. Karunamuni, San Jose, CA (US); Ian M. Henderson, Palo Alto, CA (US); Paul Russell Knight, San Francisco, CA (US); Anthony D'Auria, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 250 days.

(21) Appl. No.: 14/198,099

(22) Filed: Mar. 5, 2014

(65) Prior Publication Data

US 2014/0365854 A1 Dec. 11, 2014

Related U.S. Application Data

(60) Provisional application No. 61/832,915, filed on Jun. 9, 2013.

(51) Int. Cl.
| | |
|---|---|
| *G06F 3/041* | (2006.01) |
| *G06F 3/0483* | (2013.01) |
| *G06F 3/0485* | (2013.01) |
| *G06F 3/0484* | (2013.01) |
| *G06F 3/0481* | (2013.01) |
| *G06F 3/0482* | (2013.01) |

(Continued)

(52) U.S. Cl.
CPC .......... *G06F 3/0483* (2013.01); *G06F 3/0481* (2013.01); *G06F 3/0482* (2013.01); *G06F 3/0485* (2013.01); *G06F 3/0488* (2013.01); *G06F 3/04842* (2013.01); *G06F 3/04845* (2013.01); *G06F 3/04883* (2013.01); *G06F 17/2235* (2013.01); *G06F 17/2247* (2013.01)

(58) Field of Classification Search
CPC ..... G06F 3/04842; G06F 3/0481; G06F 3/017
USPC .................. 715/777, 781, 863, 864; 345/629
See application file for complete search history.

(56) References Cited

U.S. PATENT DOCUMENTS

| | | | |
|---|---|---|---|
| 8,200,962 B1 * | 6/2012 | Boodman | G06F 21/53 713/161 |
| 8,392,429 B1 * | 3/2013 | Clancy | G06F 17/30864 707/738 |

(Continued)

FOREIGN PATENT DOCUMENTS

JP    2009-266188    11/2009

OTHER PUBLICATIONS

Extended European Search Report in Application No. 14163054.1, dated Dec. 17, 2014, 8 pages.

(Continued)

*Primary Examiner* — Mohammed-Ibrahim Zuberi
(74) *Attorney, Agent, or Firm* — Squire Patton Boggs (US) LLP

(57) ABSTRACT

Stacked tab views are described. A computing device can display multiple content panes in a web browser window. Each content pane can correspond to a different web site. The content panes can be arranged in a visual stack, where content pane are positioned one in front of another in a three-dimensional view. In the three-dimensional view, a distance between content panes can appear to separate the content panes. Each content pane can display snapshot image of content of a web site. The content panes can be used in place of tabs for navigating between web pages.

20 Claims, 13 Drawing Sheets

(51) Int. Cl.
*G06F 3/0488* (2013.01)
*G06F 17/22* (2006.01)

(56) References Cited

U.S. PATENT DOCUMENTS

| | | | |
|---|---|---|---|
| 8,451,246 B1* | 5/2013 | Scholler | G06F 3/04883 |
| | | | 345/173 |
| 8,875,046 B2* | 10/2014 | Jitkoff | 345/173 |
| 9,060,320 B1* | 6/2015 | Cairns | H04W 48/00 |
| 9,070,211 B1 | 6/2015 | Kroeger | |
| 9,219,719 B1* | 12/2015 | Jagpal | H04L 63/062 |
| 2006/0161861 A1* | 7/2006 | Holecek | G06F 17/30994 |
| | | | 715/782 |
| 2011/0181521 A1* | 7/2011 | Reid | G06F 3/0483 |
| | | | 345/173 |
| 2012/0084723 A1* | 4/2012 | Reeves | G06F 1/1616 |
| | | | 715/802 |
| 2012/0131321 A1* | 5/2012 | Jitkoff | G06F 1/3203 |
| | | | 713/2 |
| 2012/0131441 A1* | 5/2012 | Jitkoff | G06Q 30/0641 |
| | | | 715/234 |
| 2012/0131495 A1 | 5/2012 | Goosens et al. | |
| 2012/0131519 A1* | 5/2012 | Jitkoff | G06F 3/0481 |
| | | | 715/863 |
| 2013/0047080 A1* | 2/2013 | Kroeger | G06F 17/212 |
| | | | 715/273 |
| 2014/0068440 A1* | 3/2014 | Wiltzius | G06F 3/0481 |
| | | | 715/727 |
| 2014/0089914 A1* | 3/2014 | Kay | G06F 8/61 |
| | | | 717/176 |
| 2015/0212670 A1* | 7/2015 | Chang | G06F 3/0483 |
| | | | 715/739 |
| 2015/0249675 A1* | 9/2015 | Yeung | H04L 29/08072 |
| | | | 726/22 |

OTHER PUBLICATIONS

Korean Office Action in Application No. 10-2014-36025, dated Apr. 20, 2015, 4 pages.

\* cited by examiner

# REORDERING CONTENT PANES IN A STACKED TAB VIEW

CROSS-REFERENCE TO RELATED APPLICATIONS

This application claims priority to U.S. Provisional Patent Application No. 61/832,915, filed Jun. 9, 2013, the entire contents of which are incorporated herein by reference.

TECHNICAL FIELD

This disclosure relates generally to graphical user interface items.

BACKGROUND

A web browser can implement a tabbed graphical user interface (GUI). A browser implementing tabbed GUI can allow a user to open multiple web pages in a single browser window. The browser can display multiple tabs side by side, usually at or near the top of the browser window. Each tab can correspond to a different web page. When the browser receives a user selection of a tab, a pane of the browser window, usually below the tabs, can display a corresponding web page. A user can switch between web pages by clicking different tabs.

SUMMARY

Stacked tab views are described. A computing device can display multiple content panes in a web browser window. Each content pane can correspond to a different web site. The content panes can be arranged in a visual stack, where content pane are positioned one in front of another in a three-dimensional view. In the three-dimensional view, a distance between content panes can appear to separate the content panes. Each content pane can display snapshot image of content of a web site. The content panes can be used in place of tabs for navigating between web pages.

The computing device can display content of a web page in a full screen mode upon receiving a user selection selecting a content pane corresponding to that web page. In addition, the computing device can order the content panes upon receiving a user input. In response to a user input moving a content pane from an original position to a new position, the computing device can move that content pane in an animated motion, where another content pane, if in the way between the original position and the new position, ducks in response to the movement of the moving content pane.

The features described in this specification can be implemented to achieve one or more advantages. For example, compared to a conventional tab control, a computing device implementing stacked tab view can provide a preview of multiple web pages in one display screen. The previews can help a user to select a web site that the user wishes to visit. Smooth animation provided in rearranging the content panes can be more life-like and intuitive than conventional tab controls.

The details of one or more implementations of stacked tab view are set forth in the accompanying drawings and the description below. Other features, aspects, and advantages of stacked tab view will become apparent from the description, the drawings, and the claims.

BRIEF DESCRIPTION OF THE DRAWINGS

Like reference symbols in the various drawings indicate like elements.

DETAILED DESCRIPTION

Exemplary Stacked Tab View

Figure 1:
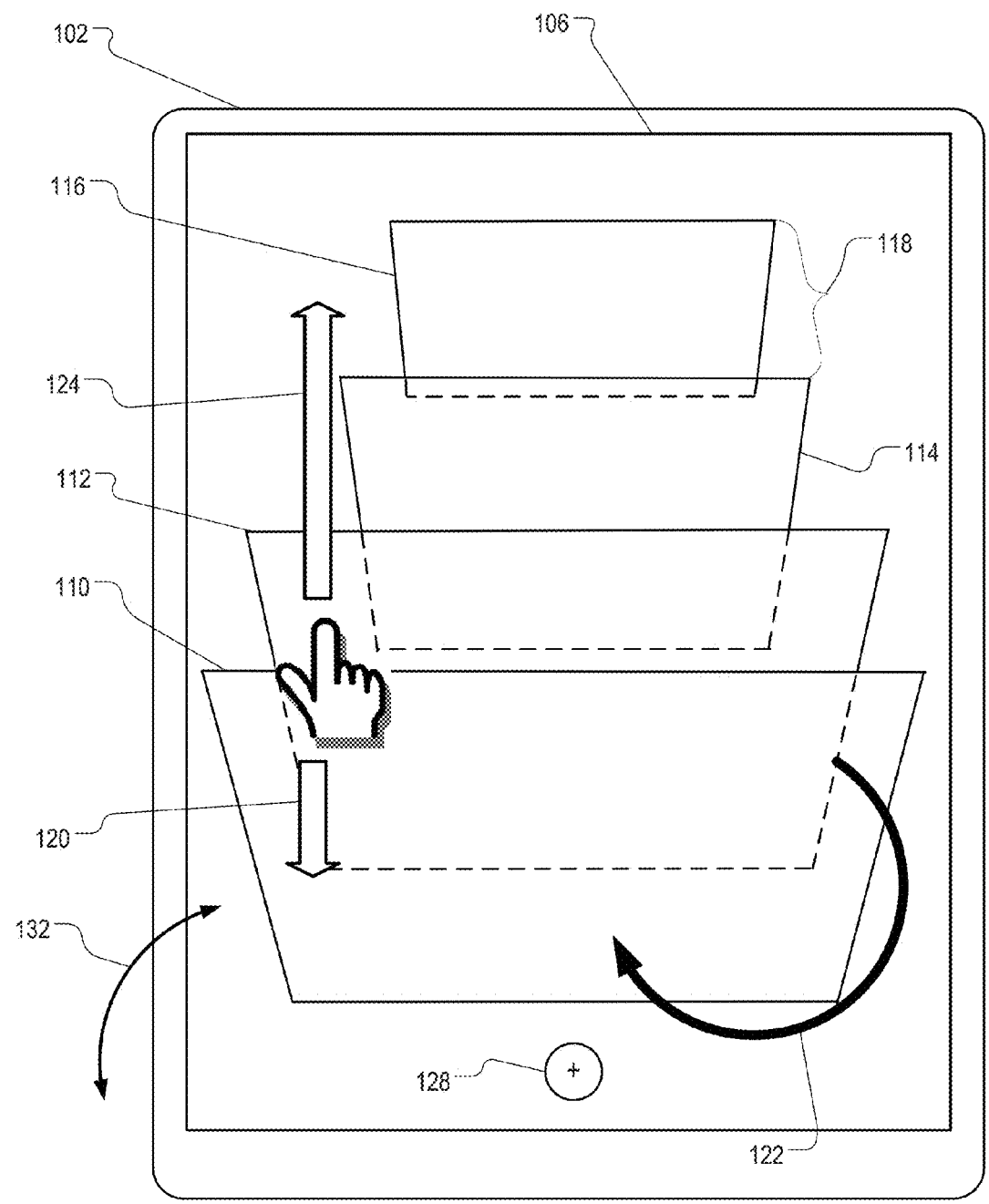
FIG. 1 is a diagram illustrating an exemplary stacked tab view.

FIG. 1 is a diagram illustrating an exemplary stacked tab view. The features and operations of the stacked tab view can be implemented by computing device 102. Computing device 102 can be a stationary device (e.g., a cloud computing server) or a mobile device (e.g., a tablet computer, a smart phone, or a wearable computing device). Computing device 102 can include or be coupled to display surface 106 (e.g., a touch-sensitive display screen). Computing device 102 can execute a computer program (e.g., a web browser) that displays content on display surface 106.

Computing device 102 can display content panes 110, 112, 114, and 116 on display surface 106. Each of content panes 110, 112, 114, and 116 can be a visual area corresponding to a same or different web page. Each of content panes 110, 112, 114, and 116 can include a snapshot (e.g., an image) of content of the corresponding web page. Content panes 110, 112, 114, and 116 can be arranged as a three-dimensional visual stack. For example, each of content panes 110, 112, 114, and 116 can appear standing upright from a base surface (e.g., a visible or invisible floor). A distance (e.g., distance 118) on a Z-axis can separate each of content panes 112, 114, 116 from another content pane. Each of content panes 112, 114, 116 can be partially obscured by a content pane in front of it (e.g., that appears closer to a user). The obscured portions of content panes 112, 114, 116 are illustrated using dashed lines in FIG. 1.

Computing device 102 can receive a selection input (e.g., a touch input) selecting one of content panes 112, 114, 116. Upon receiving the selection input, computing device 102 can display content of the web page corresponding to the selected content pane in full screen mode. Displaying the content in full screen mode can include rendering the content, and optionally, one or more control items (e.g., a navigation toolbar including control items for navigating between web pages) and/or one or more decorative items on the entire area of display surface 106.

Computing device 102 can receive position gesture input 120 for moving content pane 112 forward. Position gesture input 120 can be a forward gesture, where a stylus or finger touches an un-obscured portion of content pane 112 and, while touching the un-obscured portion of content pane 112, swipes down toward a bottom edge of display surface 106, appearing toward a user. In response, computing device 102 can shift content pane 112 and content panes 114 and 116, which are located behind content pane 112, forward (e.g., toward a user). In various implementations, distances between content panes 112, 114, and 116 can increase, or, additionally or alternatively, a new content pane can appear behind content pane 116. Computing device 102 can increase the distances, add the new content pane, or both, upon determining that the forward gesture has reached a threshold (e.g., a threshold distance or a threshold speed).

Position gesture input 120 can move content pane 112 in front of content pane 110. Computing device 102 can determine that position gesture input 120 swipes, while touching display surface 106, down to a position over content pane 110, and then releases content pane 112. In response, computing device 102 can position content pane 112 in front of content pane 110 in animation 122.

Animation 122 can have the appearance of content pane 110 ducking under content pane 112 and reappearing behind content pane 112. Computing device 102 can animate the ducking. In some implementations, computing device 102 can cause content pane 110 to move toward a bottom edge of display surface 106 until content pane 110 appears to be positioned lower than a visible or invisible floor on which content panes 112, 114, and 116 stand. In some implementations, computing device 102 can reduce a height of content pane 110 to make content pane 110 appear shorter until content pane reaches a height threshold. In some implementations, computing device 102 can change a display perspective of content pane 110 such that content pane 110 appears to be changing from a standing position to a lying down position.

Before, during, or after the ducking animation, computing device 102 can cause content pane 112 to move forward, e.g., to a position originally occupied by content pane 110. Computing device 102 can then cause content pane 110 to move up behind content pane 112, until content pane 110 is at a position originally occupied by content pane 112. The movement in animation 122 can include keeping the proportions of content pane 112, or changing the proportions (e.g., by reducing a height) of content pane 112.

Computing device 102 can receive position gesture input 124 for moving content pane 112 backward. Position gesture input 124 can be a backward gesture, where a stylus or finger touches an un-obscured portion of content pane 112 and, while touching the un-obscured portion of content pane 112, swipes up toward a top edge of display surface 106, appearing in a direction away from a user. In response, computing device 102 can shift content pane 112 and content panes 114 and 116, which are located behind content pane 112, backward (e.g., away from a user). In various implementations, distances between content panes 112, 114, and 116 can decrease, or, additionally or alternatively, a last content pane (in this example, content pane 116) can disappear. Computing device 102 can decrease the distances, remove content pane 116, or both, upon determining that the backward gesture has reached a threshold (e.g., a threshold distance or a threshold speed).

Position gesture input 124 can move content pane 112 behind content pane 114. Computing device 102 can determine that position gesture input 124 swipes, while touching content pane 112, up to a position over content pane 114, and then releases content pane 112. In response, computing device 102 can position content pane 112 behind content pane 114 in an animation.

The animation can have the appearance of content pane 114 ducking under content pane 112 and reappear in front of content pane 112. Computing device 102 can animate the ducking. In some implementations, computing device 102 can cause content pane 114 to move toward a bottom edge of display surface 106 until content pane 114 appears to be positioned lower than a visible or invisible floor on which content panes 110, 112, and 116 stand. In some implementations, computing device 102 can reduce a height of content pane 114 to make content pane 110 appear shorter until content pane reaches a height threshold. In some implementations, computing device 102 can change a display perspective of content pane 114 such that content pane 114 appears to be changing from a standing position to a lying down position.

Before, during, or after the ducking animation, computing device 102 can cause content pane 112 to move backward, e.g., to a position originally occupied by content pane 114. Computing device 102 can then cause content pane 114 to move up in front of content pane 112, until content pane 114 is at a position originally occupied by content pane 112.

Computing device 102 can receive an add pane input. The add pane input can include an input moving all content panes 110, 112, 114, and 116 backward (e.g., away from a user) for more than a threshold distance. A new content pane can appear in front of content pane 110. In some implementations, the add pane input can include a user input by touching add pane virtual button 128. In response to determining that a user touched add pane virtual button 128, computing device 102 can cause content panes 110, 112, 114, and 116 to move backward to make room for the new content pane. Computing device 102 can display the new content pane at the position originally occupied by content pane 110.

Computing device 102 can adjust positions, display perspectives, or both, of content panes 110, 112, 114, and 116 in response to tilt input 132 to simulate a parallax effect. Tilt input 132 can tilt display surface 106 such that a distance between one edge (e.g., left edge or bottom edge) of display surface 106 and a viewer (e.g., a user holding display surface 106) is different from a distance between an opposite edge (e.g., right edge or top edge, respectively) and the viewer. Computing device 102 can detect tilt input 132 using a motion sensor (e.g., an accelerometer or a gyroscope or both) coupled to computing device 102. In response, computing device 102 can adjust a position or an orientation of each of content panes 110, 112, 114, and 116 to simulate a three-dimensional visual effect (e.g., a parallax effect) of the tilt.

For example, in some implementations, upon determining that display surface is tilted to the left, where a distance between a left edge of display surface 106 and a viewer is greater than a distance between a right edge of display surface 106 and a user, computing device 102 can shift the relative positions of content panes 110, 112, 114, and 116. Computing device 102 can move one or more of content panes 110, 112, 114, and 116 horizontally, each for a distance determined based on an angle of the tilt and a respective distance between the content pane and the viewer. The movement of the one or more of content panes 110, 112, 114, and 116 can have the visual effect of a content pane in a relative front position moves to a relative left, and a content pane in a relative back position moves to a relative right.

In some implementations, upon determining that display surface is tilted to the left, computing device 102 can change an orientation of each of content panes 110, 112, 114, and 116, such that each of content panes 110, 112, 114, and 116 appear to be facing right at an angle that corresponds to an angle of the tilt.

Figure 2A:
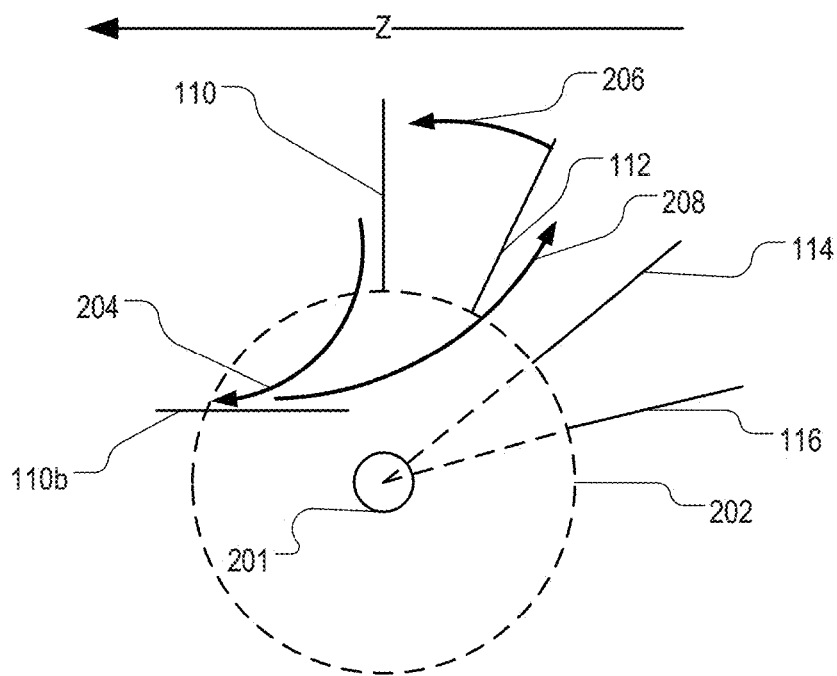
FIGS. 2A and 2B are diagrams illustrating exemplary animations of re-arranging positions of content panes in a stacked tab view.
Figure 2B:
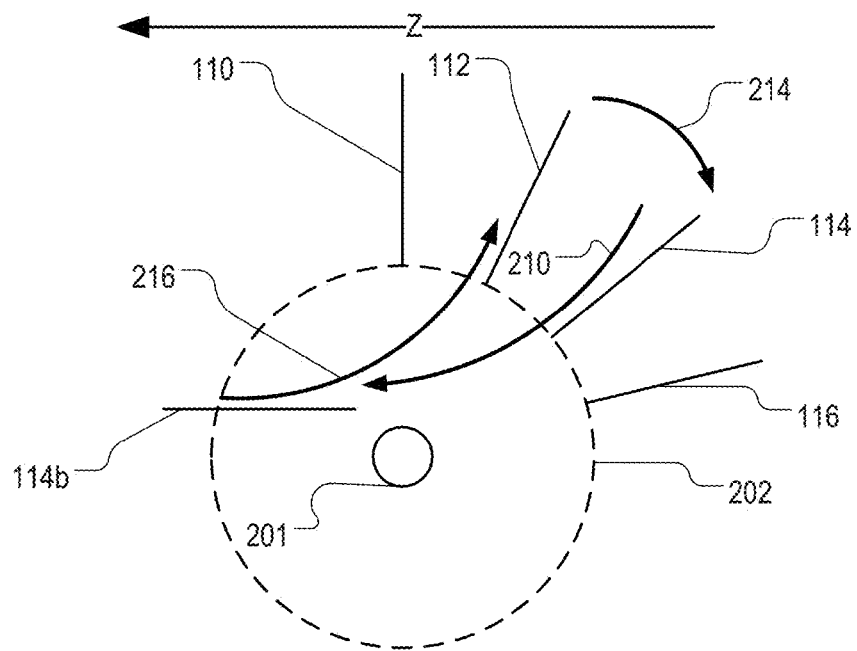

FIGS. 2A and 2B are diagrams illustrating exemplary animations of re-arranging positions of content panes in a stacked tab view. FIG. 2A can correspond to animation 122 of FIG. 1. FIG. 2A shows a conceptual view of the animation 122 from a right side of display surface 106. A Z-axis, pointing to a viewer, illustrates the layered spatial relationship between content panes 110, 112, 114, and 116.

Content panes 110, 112, 114, and 116 can be arranged in a parallel stack, where each of content panes 110, 112, 114, and 116 is parallel to another. In some implementations, content panes 110, 112, 114, and 116 can be arranged in a rolodex stack, where each of content panes 110, 112, 114, and 116 appears to point upward or downward to a visible or invisible horizontal axis 201. Horizontal axis 201 can be below a bottom edge of display surface 106. In some implementations, content panes 110, 112, 114 can appear to be attached, each at a bottom edge, to roller 202. Roller 202 can be displayed as a floor in display surface 106. In some implementations, roller 202 can be invisible, and defined by a display perspective of content panes 110, 112, 114, and 116.

In animation 122 (where content pane 112 is selected to switch position with content pane 110), computing device 102 can move content pane 110 downward toward a bottom edge of display surface 106 in motion 204. After motion 204, content pane 110 can appear in position 110b, which can be a supine (e.g., content facing up) position or a prone (e.g., content facing down) position at a location in front of an original position of content pane 110 (e.g., closer to the user on the Z-axis). In some implementations, motion 204 can be a sliding motion along a path indicated by the arrow as shown in motion 204. In the sliding motion, a top edge of content pane 110 can move down, a bottom edge of content pane 110 can move toward the viewer until content pane 110 appears to be in a horizontal supine position. In some implementations, motion 204 can be a flipping motion. In the flipping motion, a bottom edge of content pane 110 can remain unchanged a top edge of content pane 110 can move toward a viewer until content pane 110 appears to be in a horizontal prone position.

Computing device 102 can then move content pane 112 forward in motion 206, to a position originally occupied by content pane 110. Computing device 102 can move content pane 110 from position 110b to a position originally occupied by content pane 112 in motion 208. If position 110b is a supine position, motion 208 can be a sliding motion along a path indicated by the arrow as shown in motion 208. In the sliding motion, a top edge of content pane 110 (the right-most point of the line showing 110b) can move up, a bottom edge of content pane 110 (the left-most point of the line showing 110b) can move back (e.g., to the right in FIG. 2A, opposite to the direction as shown in the Z-axis) until content pane 110 stands up at the position occupies the position originally occupied by content pane 112. If position 110b is a prone position, motion 208 can be a flipping motion.

FIG. 2B shows a right-sided view of the animation for moving content pane 112 behind content pane 114. In the animation, computing device 102 can move content pane 114 down in motion 210. After motion 210, content pane 114 can appear in position 114b.

Computing device 102 can then move content pane 112 backward in motion 214, to a position originally occupied by content pane 114. Computing device 102 can move content pane 114 from position 114b to a position originally occupied by content pane 114 in motion 216. Each of motion 210 and motion 216 can be a sliding motion or a flipping motion.

Figure 2C:
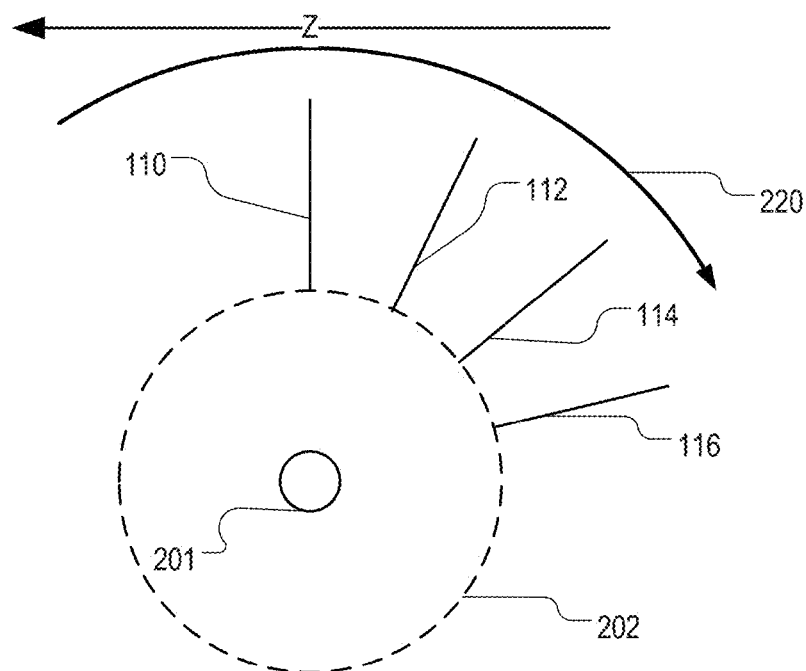
FIGS. 2C and 2D are diagrams illustrating exemplary animations of rolodex-like operations of a stacked tab view.
Figure 2D:
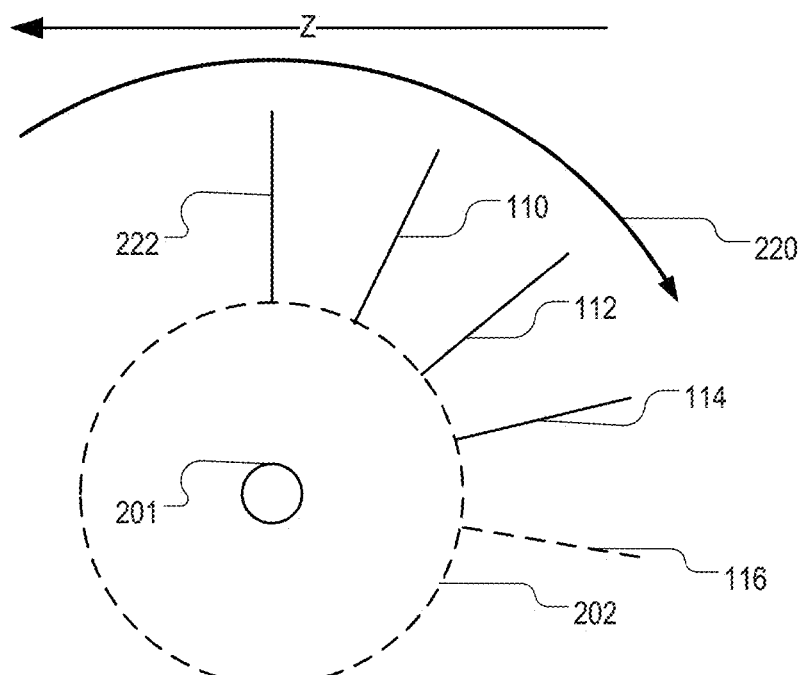

FIGS. 2C and 2D are diagrams illustrating exemplary animations of rolodex-like operations of a stacked tab view. FIG. 2C illustrates an exemplary rotating motion viewed from a right-side of display surface 106. Upon receiving a rotation gesture, e.g., a gesture that swipes cross multiple content panes, computing device 102 can cause content panes 110, 112, 114, and 116 to rotate (220) around horizontal axis 201. For example, computing device 102 can receive a gesture moving up from a place at or proximate to a bottom edge of display surface 106 across all of content panes 110, 112, 114, and 116 to a place at or proximate to a top edge of display surface 106, which has the apparent trajectory of moving from the front to the back. In response, computing device 102 can cause the rotation (220) movement.

FIG. 2D illustrates exemplary operations of adding a new content pane. In some implementations, computing device 102 can determine that rotation 220 has caused content pane 110, 112, 114, and 116 to move back (e.g., away from a viewer on the Z-axis) a threshold distance sufficient to place new content pane 222 for display on display surface 106. In response, computing device 102 can display content surface 222 at a position originally occupied by a front-most content pane (e.g., content pane 110).

In some implementations, computing device 102 can receive a new content pane input (e.g., through new pane button 128). In response, computing device 102 can move content pane 110, 112, 114, and 116 backwards (e.g., away from a viewer) until sufficient space in front of content pane 110 is created to accommodate new content pane 222. Computing device 102 can add new content pane 222 in the space in front of content pane 110.

New content pane 222 can correspond to a new display area, initially not associated with a particular web page. Details on displayed items in new content pane 222 are described below in reference to FIGS. 3B and 3C. Alternatively, new content pane 222 can include a snapshot of a content page. The content page can be a web page previously opened but not displayed in the stacked tab view due to a pre-specified limit on number of content panes simultaneously displayed in a stacked tab view.

Computing device 102 can determine that, following rotation 220 content pane 116 has moved to a position that is invisible (e.g., below a virtual floor or completely obscured by other content panes). Additionally or alternatively, computing device 102 can determine, due to the addition of new content pane 222, the total number of content panes, if including content pane 116, which is located the farthest from a viewer, exceeds the pre-specified limit. In response, computing device 102 can designate content pane 116 as inactive, and remove content pane 116 from display in the stacked tab view. Computing device 102 can re-activate content pane 116 and display content pane 116 upon receiving an input to rotate content panes 222, 110, 112, and 114 forward.

Figure 3A:
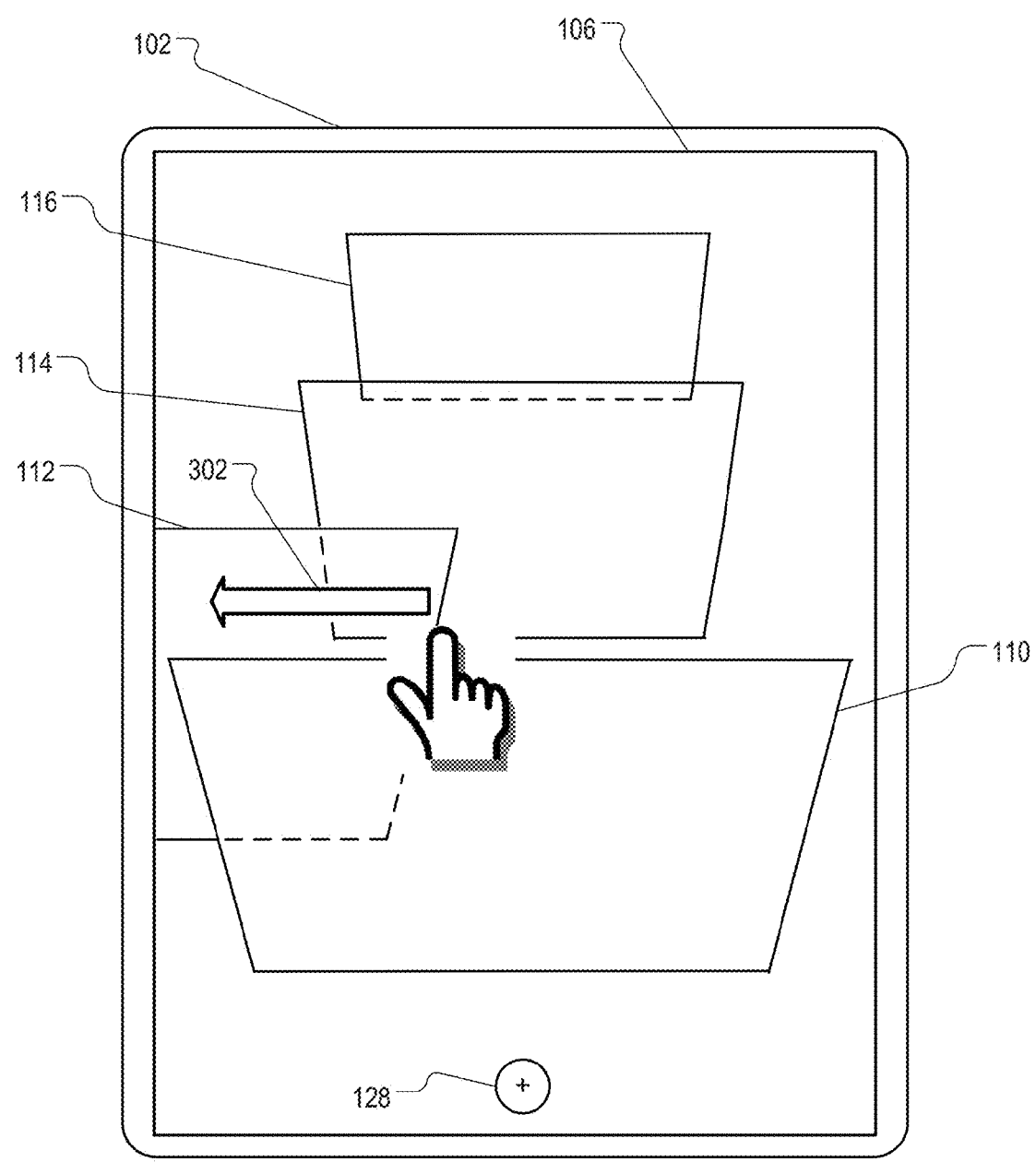
FIG. 3A is a diagram illustrating exemplary operations of closing a content pane.

FIG. 3A is a diagram illustrating exemplary operations of closing a content pane. Computing device 102 can receive deletion gesture input 302. Deletion gesture input 302 can include a touch on display surface 106 on an un-obscured portion of content pane 112. Deletion gesture input 302 can include a sideways swiping motion (e.g., toward a left edge or right edge of display surface 106) while touching the un-obscured portion of content pane 112. Computing device 102 can cause content pane 112 to move following a direction of the swiping motion. Computing device 102 can determine that a distance of the sideways swiping has satisfied a deletion threshold. In response, computing device 102 can remove content pane 112 from the stacked tab view.

Upon removal of content pane 112, computing device 102 can move forward content panes 114 and 116, originally behind content pane 112, to occupy the position originally occupied by content pane 112. Alternatively or additionally, upon removal of content pane 112, computing device 102 can move content pane 110, originally in front content pane 112, backward to occupy the position originally occupied by content pane 112.

Figure 3B:
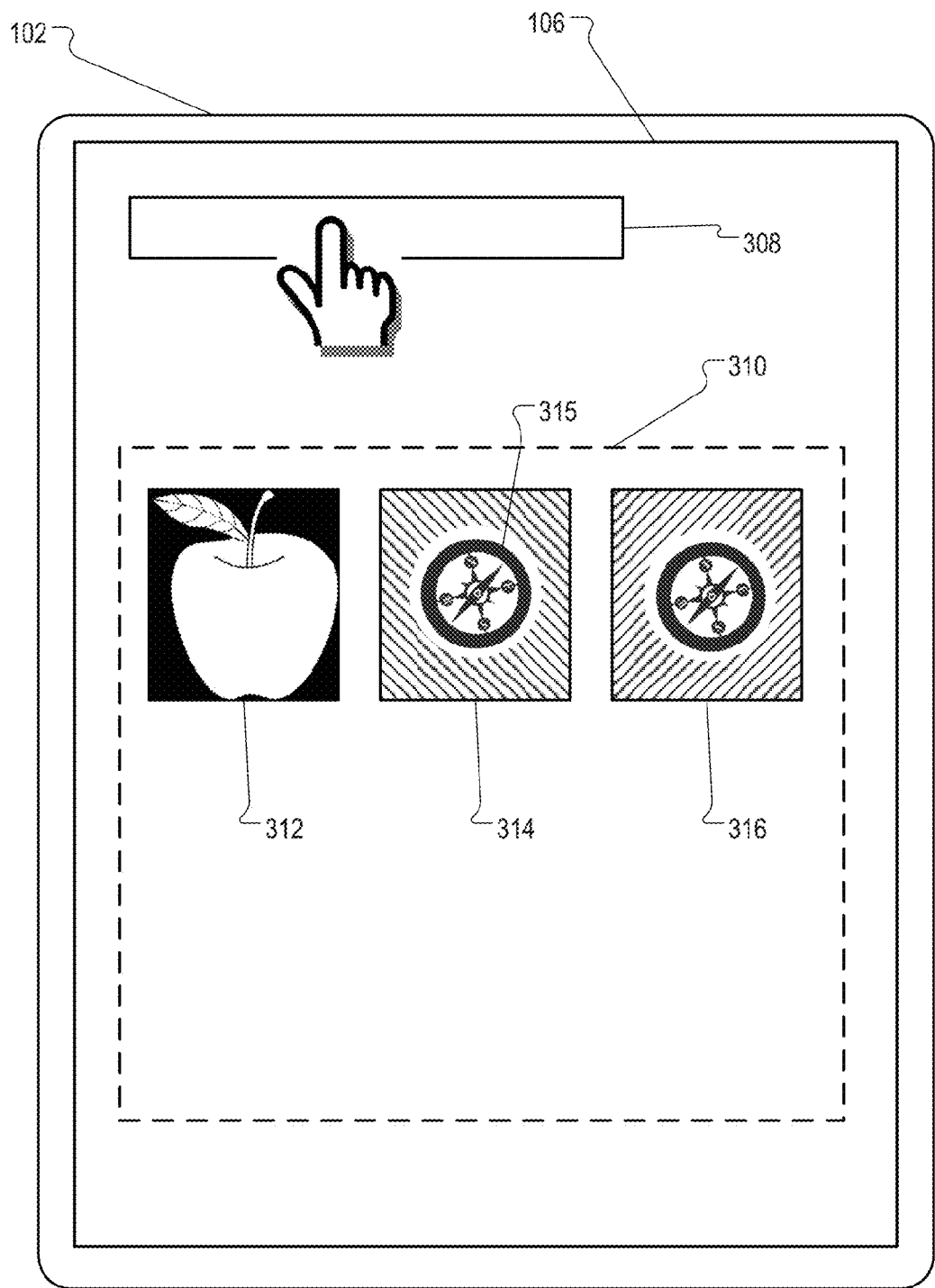
FIG. 3B is a diagram illustrating an exemplary content pane in grid mode upon selection from a stacked tab view.

FIG. 3B is a diagram illustrating an exemplary content pane in grid mode upon selection from a stacked tab view. The exemplary content pane can be new content pane 222 of FIG. 2.

New content pane 222 may be a new window unassociated with a web page. Upon receiving a selection input, new content pane 222 can enter a full screen display mode, where content in new content pane 222 occupies display surface 106 in place of a stack tab view. New content pane 222 can include input box 308 configured to receive text input for a uniform resource locator (URL) of a web site.

New content pane 222 can include grid view area 310. Grid view area 310 is a portion of new content pane 222, with or without a border, configured to display images in a grid layout. The grid layout can include X number of columns and Y number of rows. The images can include exemplary images 312, 314, and 316. Images 312, 314, and 316 can correspond to a group of links to web sites or remote documents stored in a folder or in a bookmark file. Each of images 312, 314, and 316 can correspond to one of the links in the folder or bookmark file.

Computing device 102 can determine images 312, 314, and 316 based on their respective content sources. Computing device 102 can retrieve an image designated as a representative image (e.g., a favicon for identifying a web site or web page). For example, computing device 102 can retrieve a favicon from a first web site. Computing device 102 can determine that the retrieved favicon satisfies a size threshold (e.g., is at least as large as M×N pixels). In response, computing device 102 can adjust (e.g., enlarge or reduce) a size of the retrieved favicon to a predetermined size that fits a grid, and display the adjusted favicon as image 312 in grid view area 310. Upon receiving a user input selecting image 312, computing device 102 can provide content of the first web site for display on display surface 106.

Computing device 102 can retrieve a representative image from a second web site. Computing device 102 can determine that the retrieved image fails to satisfy the size threshold. In response, computing device 102 can determine a dominant color of the retrieved image. Computing device 102 can determine the dominant color based on a color of most numerous non-white pixels of the retrieved image, or based on an average color of the non-white pixels. Computing device 102 can generate image 314 based on the dominant color. Generating image 314 can include determining an image based on the dominant color, a size specified for the grid, and an image 315. Image 315 can be an image provided by computing device 102 having a color that contrasts to the dominant color. Upon receiving a user input selecting image 314, computing device 102 can provide content of the second web site for display on display surface 106.

Computing device 102 can determine that a third web site does not provide a representative image. In response, computing device 102 can determine image 316, which can be a default image. Computing device 102 can then provide image 316 for display in grid view area 310. Upon receiving a user input selecting image 316, computing device 102 can provide content of the third web site for display on display surface 106.

Figure 3C:
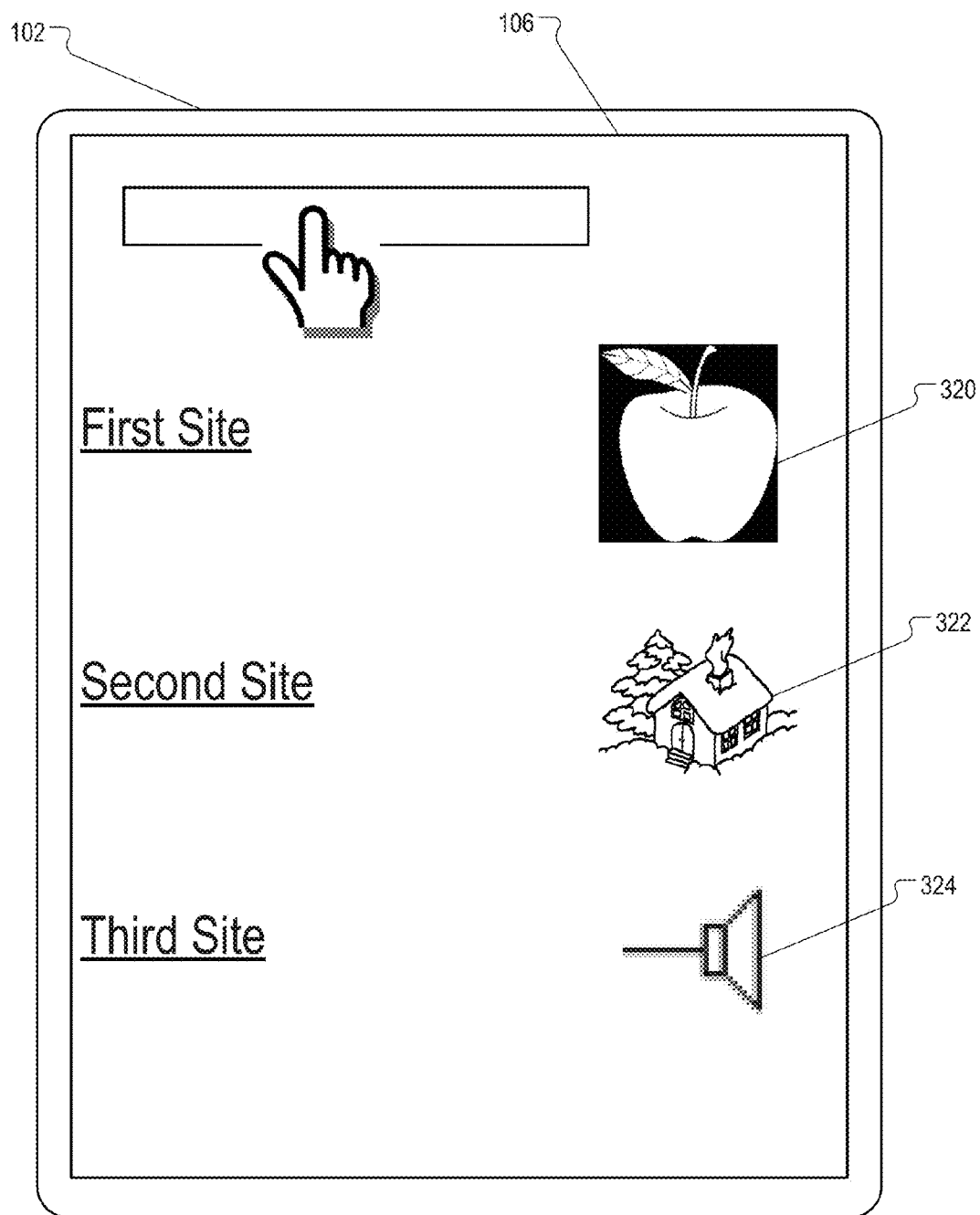
FIG. 3C is a diagram illustrating an exemplary content pane in list mode upon selection from a stacked tab view.

FIG. 3C is a diagram illustrating an exemplary content pane in list mode upon selection from a stacked tab view. The content pane can be content pane 110, 112, 114, 116, or 222.

Computing device 102 can display a list of content items saved on computing device 102 or a remote server. The list can include content items, e.g., locally or remotely saved articles or web pages. The list can be automatically aggregated from multiple devices based on content items viewed by a user on the devices (e.g., on computing device 102 and a second computing device).

Computing device 102 can determine images 320, 322 and 324, each corresponding to a respective article or web site, for display in the list. Determining each of images 320, 322 and 324 can include identifying a representative image from the respective article or web site. Identifying the representative image can include determining a favicon of a web site, determining a largest image in an article or web site, or determining an image that includes a human face. Determining each of images 320, 322 and 324 can include cropping the identified representative image or resizing the identified representative image.

Figure 3D:
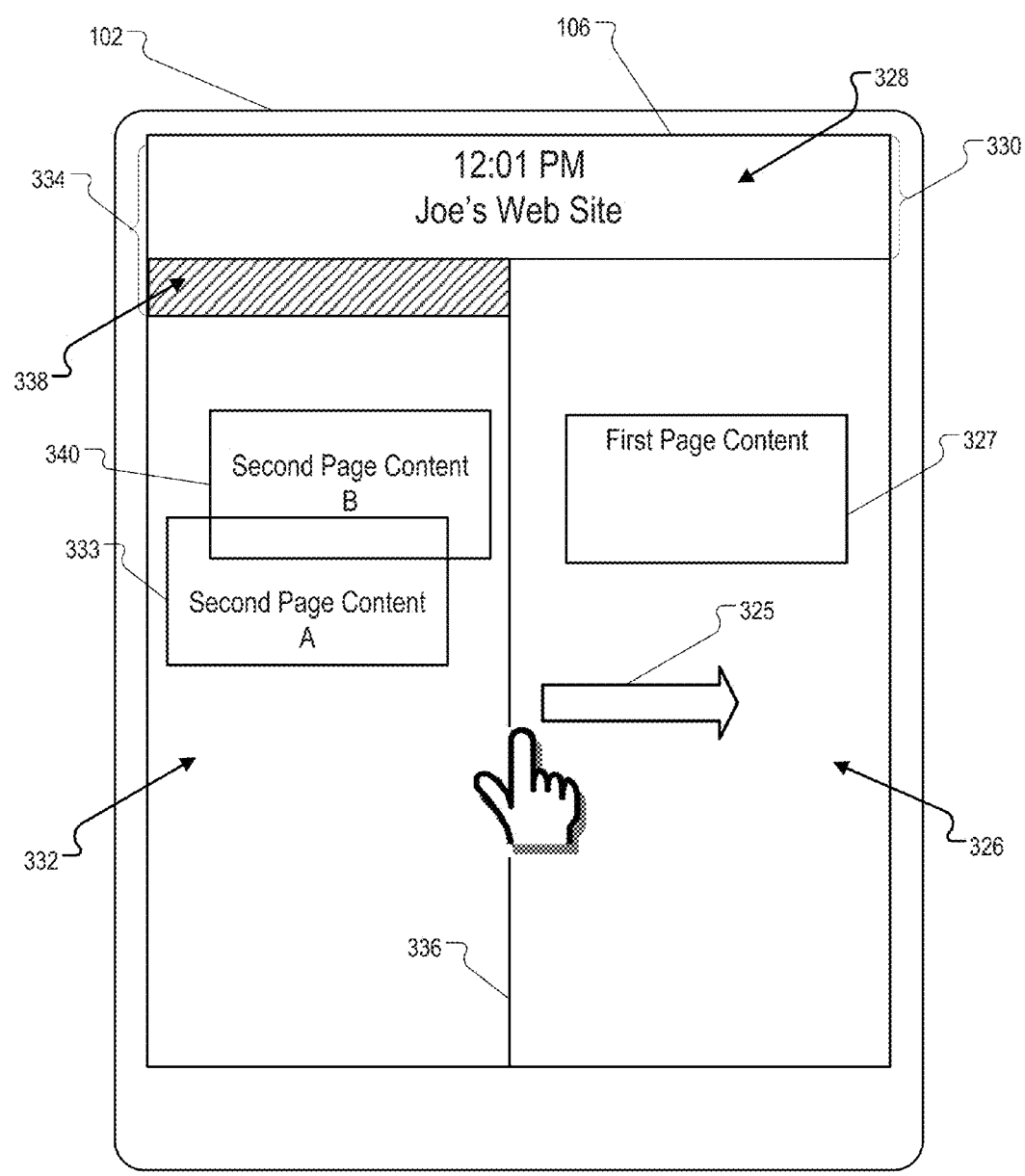
FIG. 3D is a diagram illustrating an exemplary snapshot operations of a content pane in a stacked tab view.

FIG. 3D is a diagram illustrating an exemplary snapshot operations of a content pane in a stacked tab view. The content pane can be content pane 110, 112, 114, 116, or 222.

Computing device 102 can receive navigation input 325. Navigation input 325 can be a swipe gesture input on display surface 106 displaying first content page 326. First content page 326 can be a web page including first page content 327. Computing device 102 can determine that, based on content size and user scroll history, navigation toolbar 328 has reduced height 330 when first content page 326 is displayed. In navigation toolbar 328 having reduced height 330, computing device 102 can display a web page title and hide one or more tool items (e.g., a navigation box configured to receive user-typed URL).

Upon receiving navigation input 325, computing device 102 can move first content page 326 out of display surface 106 in animation following a direction of the swipe gesture input (e.g., to the right). Computing device 102 can fill the space left by first content page 326 using snapshot 332 of a second content page. Snapshot 332 can include content item 333. Computing device 102 can create snapshot 332 of the second content page upon determining a user is leaving the second content page. For example, upon receiving navigation input 325, computing device 102 can generate a snapshot of first content page 326, and store the generated snapshot for display in the future upon determining a user is navigating back to first content page 326. Each content pane can be associated with multiple snapshots. For example, the exemplary content pane of FIG. 3D can be associated with snapshot 332 and the snapshot of first content page 326.

Snapshot 332 can be taken at a time when navigation toolbar 328 had full height 334. Computing device can display navigation toolbar 328 in full height 334 based on browsing actions by a user on the second content page (e.g., when the user scrolls up to the top of the second content page). At a time when swipe gesture input is at position 336 (e.g., near a vertical center of display surface 106), a first portion (e.g., a right side) of navigation toolbar 328 can have reduced height 330, and a second portion (e.g., a left side) of navigation toolbar 328 can have full height 334. Before first content page 326 completely moves out of display surface 106, computing device can provide for display placeholder 338 to occupy a space that is not covered by snapshot 332. The space can have a height that is the difference in height between reduced height 330 and full height 334. The space can have a width that is the distance between a left edge of display surface 106 and position 336. Computing device 102 can position placeholder 338 between navigation toolbar 328 and snapshot 332.

Computing device 102 can determine content in placeholder 338 based on content of the second web page. For example, computing device 102 can determine a background color of the second web page, and designate the background color as a color of placeholder 338. Upon determining that a rendering condition has been satisfied (e.g., upon determining that first content page 326 has completely moved out of display surface 106), computing device 102 can replace the content of placeholder 338 with a user interface item of the full-height navigation toolbar 328 that is hidden when navigation toolbar 328 has reduced height. The user interface item can be a navigation box configured to receive user-typed URL.

While filling the space using snapshot 332 of the second content page, computing device 102 can download content from a web site serving the second content page. Upon determining that a replacement condition has been satisfied, computing device 102 can remove snapshot 332, and render the downloaded content for display. The downloaded content can match snapshot 332 or be different from snapshot 332. For example, the download content can include content item 340, which can correspond to content item 333 of snapshot 332 but located at a position that is different from a position of content item 333. Removing snapshot 332 can include cross fading snapshot 332, where snapshot 332, which overlays on the downloaded content, gradually becomes transparent to reveal the downloaded content, until snapshot 332 disappears.

The replacement condition can include one or more rules, examples of which are provided below. In some implementations, computing device 102 can determine that the replacement condition is satisfied upon determining that a duration of a download reaches or exceeds a timeout threshold (e.g., X seconds).

In some implementations, computing device 102 can determine that the replacement condition is satisfied upon determining that an amount of downloaded content has satisfied a size threshold. Computing device 102 can determine the amount of downloaded content based on a number of objects downloaded. Computing device 102 can compare the number of objects downloaded with a size of a render tree, which can be determined at a time when snapshot 332 was taken. The size of the render tree can include a number of objects for rendering the second content page. Computing device 102 can determine that the amount of downloaded content has satisfied the size threshold upon determining that the number of downloaded objects is more than X percent of the render tree size.

In some implementations, computing device 102 can determine that the replacement condition is satisfied upon determining that, based on information or instruction from a web site serving the second content page, that no download will occur. In response, computing device 102 can go to a previously viewed content page instead of downloading content from the web site. Computing device 102 can remove snapshot 332 after a pause period (e.g., X milliseconds).

In some implementations, computing device 102 can determine that the replacement condition is satisfied upon determining that downloaded content will not match the snapshot. For example, computing device 102 can determine that a root object of the downloaded content does not match a root object in a render tree associated with snapshot 332.

Exemplary Device Components

Figure 4:
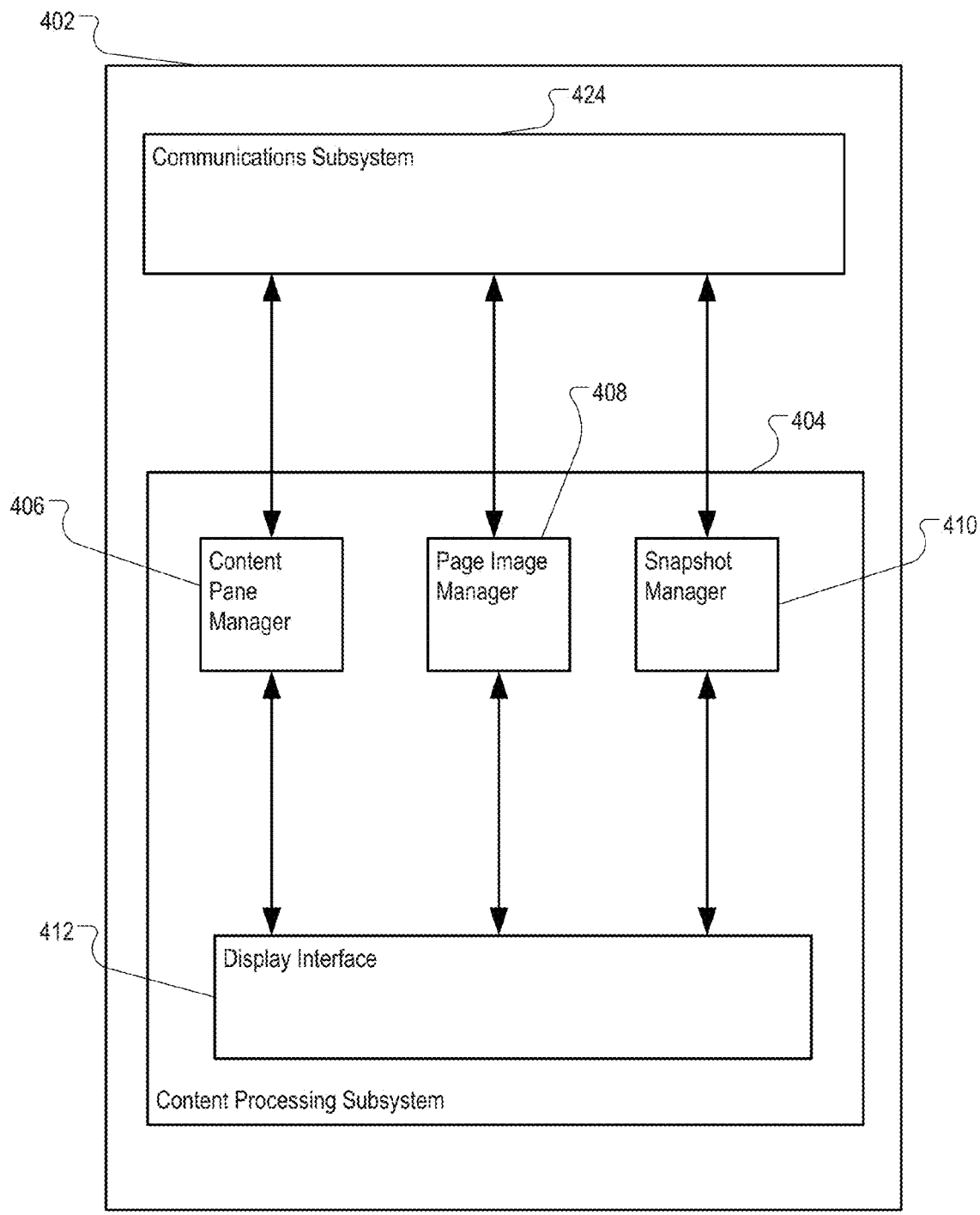
FIG. 4 is a diagram illustrating components of an exemplary stacked tab view subsystem of a computing device.

FIG. 4 is a diagram illustrating components of exemplary stacked tab view subsystem 402 of a computing device 102. Each component of tab view subsystem 402 can include hardware and software components.

Subsystem 402 can include content processing subsystem 404. Content processing subsystem 404 can include one or more processors configured to execute an application program (e.g., a web browser) that displays a stacked tab view. Content processing subsystem 404 can include content pane manager 406. Content pane manager 406 is a component of content processing subsystem 404 configured to generate a stacked view of content panes (e.g., content panes 110, 112, 114, 116, and 222) and manage movements and animation of the content panes.

Content processing subsystem 404 can include page image manager 408. Page image manager 408 is a component of content processing subsystem 404 configured to determine representative images (e.g., images 312, 314, 316, 320, 322, and 324) of content pages.

Content processing subsystem 404 can include snapshot manager 410. Snapshot manager 410 is a component of content processing subsystem 404 configured to generate snapshots (e.g., snapshot 332) of content pages and to manage the snapshots associated with multiple content panes.

Content processing subsystem 404 can include display interface 412. Display interface 412 is a component of content processing subsystem 404 configured to interact with display surface 106, including receiving inputs (e.g., a touch input or a gesture input) from display surface 106 and provide the input to content pane manager 406, page image manager 408, or snapshot manager 410. Display interface 412 can provide content generated by content pane manager 406, page image manager 408, and snapshot manager 410 for display on display surface 106.

Subsystem 402 can include communication subsystem 424. Communication subsystem 424 is a component of subsystem 402 that includes an antenna, a wireless processor (e.g., a baseband processor, Wi-Fi™ processor, or Bluetooth™ processor), and software or firmware that causes the wireless processor to perform operations of downloading content from one or more websites, and provide the content to content pane manager 406, page image manager 408, or snapshot manager 410.

Exemplary Procedures

Figure 5A:
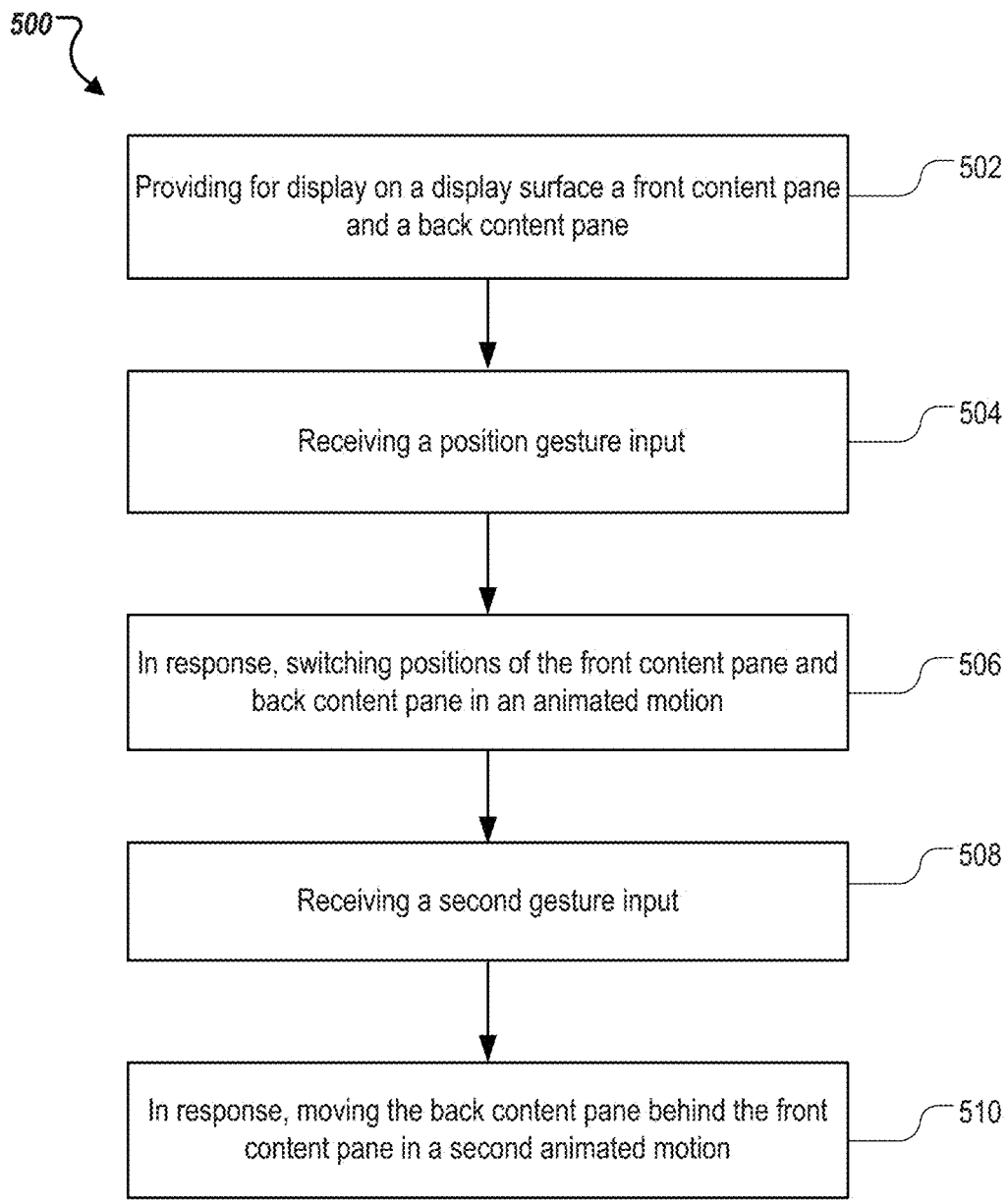
FIGS. 5A-5C are flowcharts of exemplary procedure of stacked tab view.

FIG. 5A is a flowchart of exemplary procedure 500 of non-intrusive region notification. Procedure 500 can be performed by computing device 102.

Computing device 102 can provide (502), for display on a display surface (e.g., display surface 106), a front content pane (e.g., content pane 110) and a back content pane (e.g., content pane 112). Each of the front content pane and the back content pane can be a web page or a snapshot of a web page. The snapshot can include an image of the web page. The front content pane can appear to be positioned in front of the back content pane and partially obscuring the back content pane. A distance in a depth dimension can appear to separate the front content pane and the back content pane.

In some implementations, the front content pane and the back content pane can be arranged to have an appearance that a vertical edge of the front content pane and a vertical edge of the back content pane point to a horizontal axis (e.g., horizontal axis 201) below the front content pane and the back content pane. The horizontal axis can be a visible axis displayed on the display surface or an invisible axis defined by display perspectives of the front content pane and the back content pane as illustrated in FIGS. 2A-2D. Computing device 102 can receive a pushback gesture input touching at least one of the front content pane or the back content pane and swiping upward. In response, computing device 102 can animate a rotation (e.g., rotation 220) of the front content pane and back content pane around the horizontal axis, including reducing a size of the front content pane and the back content pane and changing display perspectives of the front content pane and the back content pane to have an appearance of moving away from a viewer.

Computing device 102 can receive (504) a position gesture input (e.g., position gesture input 120) touching a portion of the back content pane not obscured by the front content pane and swiping to a position that appears to be in front of the front content pane.

In response to the position gesture input, computing device 102 can switch (506) positions of the front content pane and back content pane in an animated motion. In the animated motion, the front content pane can appear to move toward a bottom edge of the display surface. The back content pane can appear to move forward to occupy a position originally occupied by the front content pane. The front content pane can appear to move up behind the back content pane to occupy a position originally occupied by the back content pane.

In some implementations, after switching the positions in stage 506, computing device 102 can receive (508) a second position gesture input (e.g., position gesture input 124) touching the back content pane, which, after the switching, appears to be in front of the front content pane. The second position gesture can swipe to a position that appears to be behind the front content pane (now in the back).

In response to the second position gesture input, computing device 102 can move (510) the back content pane behind the front content pane in a second animated motion. In the second animated motion, the front content pane can appear to move toward the bottom edge of the display surface. The back content pane can appear to move back to occupy the position originally occupied by the back content pane. Then, the front content pane can appear to move up in front of the back content pane to occupy the position originally occupied by the front content pane.

In some implementations, computing device 102 can receive a deletion gesture input (e.g., deletion gesture input 302). The deletion gesture input can touch a portion of the front content pane or the back content pane and swipe sideways. In response, computing device 102 can remove the touched content pane from display in an animation. In the animation, the touched content pane can slide off from the display surface according to a swiping direction of the deletion gesture input.

In some implementations, computing device 102 can receive a new content pane input for adding a new content pane to display in the display surface. In response, computing device 102 can add a new content pane in front of both the front content pane and the back content pane in an animation.

In some implementations, device 102 can receive a tilt input (e.g., tilt input 132) tilting the display surface to a position where a distance between a first vertical edge of the display surface and a viewer is greater than a distance between a second vertical edge of the display surface to a viewer. In response, computing device can change an apparent plane of the front content pane and an apparent plane of the back content pane to simulate a three-dimensional effect of the tilt. The change can include an angular change or a shifting change.

Figure 5B:
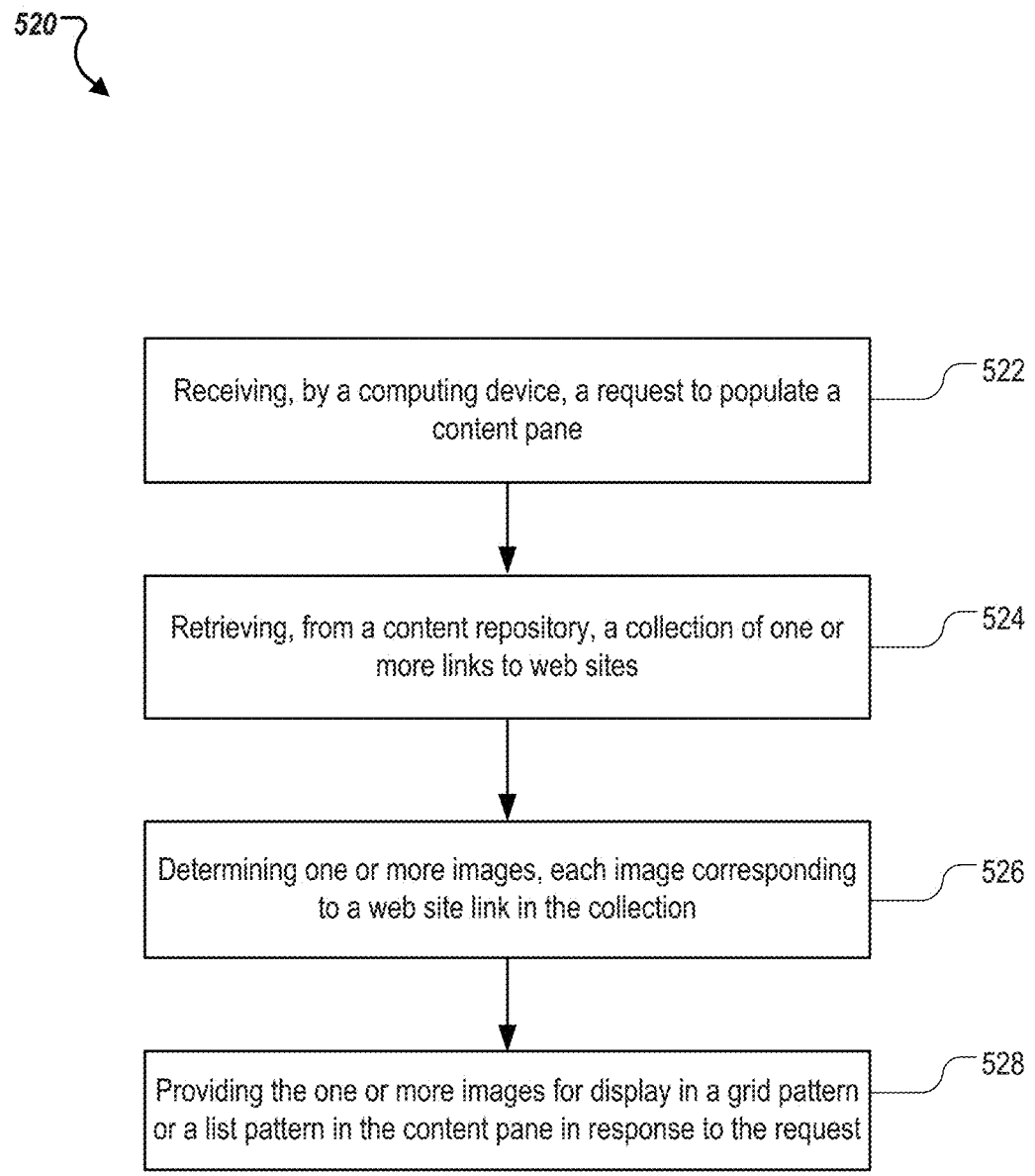

FIG. 5B is a flowchart illustrating exemplary procedure 520 of displaying a content pane in grid mode. Procedure 520 can be performed by computing device 102.

Computing device 102 can receive (522) a request to populate a content pane. The request can include a user input to create a new content pane (e.g., new content pane 222) or a user input to access a bookmark page.

Computing device 102 can retrieve (524) from a content repository, a collection of one or more links to web sites. The content repository can be a folder stored locally on computing device 102 or remotely from computing device 102. The content repository can be a bookmark page or a read list.

Computing device 102 can determine (526) one or more images. Each image can correspond to a web site link in the collection. Determining each image can include, upon determining that a representative image provided by a corresponding web site satisfies a size threshold, designating the representative image as the image corresponding to the web site. Determining each image can include, upon determining that the representative image fails to satisfy the size threshold, generating the image based on the representative image, and designating the generated image as the image corresponding to the web site. Generating the image (e.g., image 314) can include determining a dominating color based on the representative image, and generating an image corresponding to the web site based on the dominating color.

Computing device 102 can provide (528) the one or more images for display in a grid pattern (e.g., in grid view area 310) or a list pattern (e.g., as shown in FIG. 3C) in the content pane in response to the request.

Figure 5C:
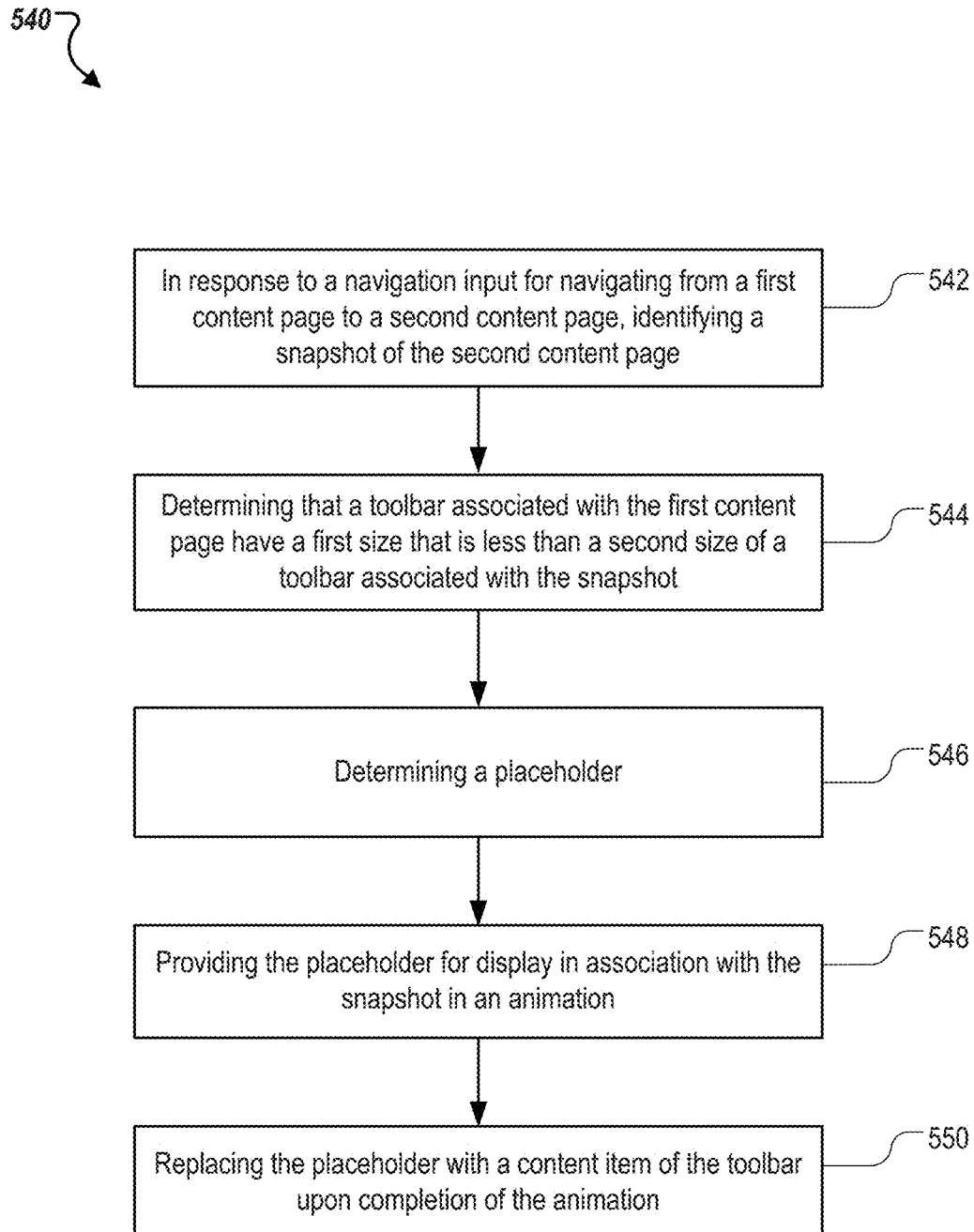

FIG. 5C is a flowchart illustrating procedure 540 of managing snapshots. Procedure 540 can be performed by computing device 102.

In response to a navigation input for navigating from a first content page to a second content page (e.g., navigation input 325), computing device 102 can identify (542) a snapshot (e.g., snapshot 332) of the second content page. The snapshot can include an image of the second content page and being associated with a web site serving the second content page.

Computing device 102 can determine (544) that a toolbar (e.g., navigation toolbar 328) associated with the first content page have a first dimension (e.g., reduced height 330) that is less than a second dimension (e.g., full height 334) of a toolbar associated with the snapshot.

Computing device 102 can determine (546) a placeholder (e.g., placeholder 338) based on a difference between the first dimension and the second dimension, and a background color associated with the second content page.

Computing device 102 can provide (548) the placeholder for display in association with the snapshot, in an animation navigating from the first content page to the second content page in response to the navigation input. Computing device 102 can replace (550) the placeholder with a content item of the toolbar upon completion of the animation.

In some implementations, computing device 102 can determine multiple snapshots. Each snapshot can be associated with a web site serving a web page. Each web site can associated with a content pane of a web browser having multiple content panes. For example, content panes 110, 112, 114, 116, and 222 each can be associated with multiple snapshots generated during navigation.

Computing device 102 can receive a signal from an operating system of computing device 102 or from an application program. The signal can indicate a level of memory usage pressure (e.g., medium, high, or critical). In response, computing device 102 can remove one or more snapshots based on the level of memory usage pressure.

For example, upon determining that the signal indicates a medium memory usage pressure level, computing device 102 can iterate through content panes designated as inactive (e.g., content panes not currently displayed in full screen mode). In the iteration, computing device 102 can remove one or more snapshots associated with the inactive content panes. Upon determining that the signal indicates a high memory usage pressure level, computing device 102 can remove one or more snapshots associated with the inactive content panes and one or more snapshots associated with an active content pane (e.g., a content pane currently displayed in full screen mode) except a current snapshot, a forward snapshot, and a previous snapshot. The current snapshot can be an image of a content page currently displayed in the content pane. The forward snapshot page reachable when navigating from the current displayed web page in a first direction (e.g., to a right side of the current displayed web page). The previous snapshot page reachable when navigating from the current displayed web page in a second direction (e.g., to a left side of the current displayed web page). Upon determining that the signal indicates a critical memory usage pressure level, computing device 102 can remove all snapshots.

Exemplary Device Architecture

Figure 6:
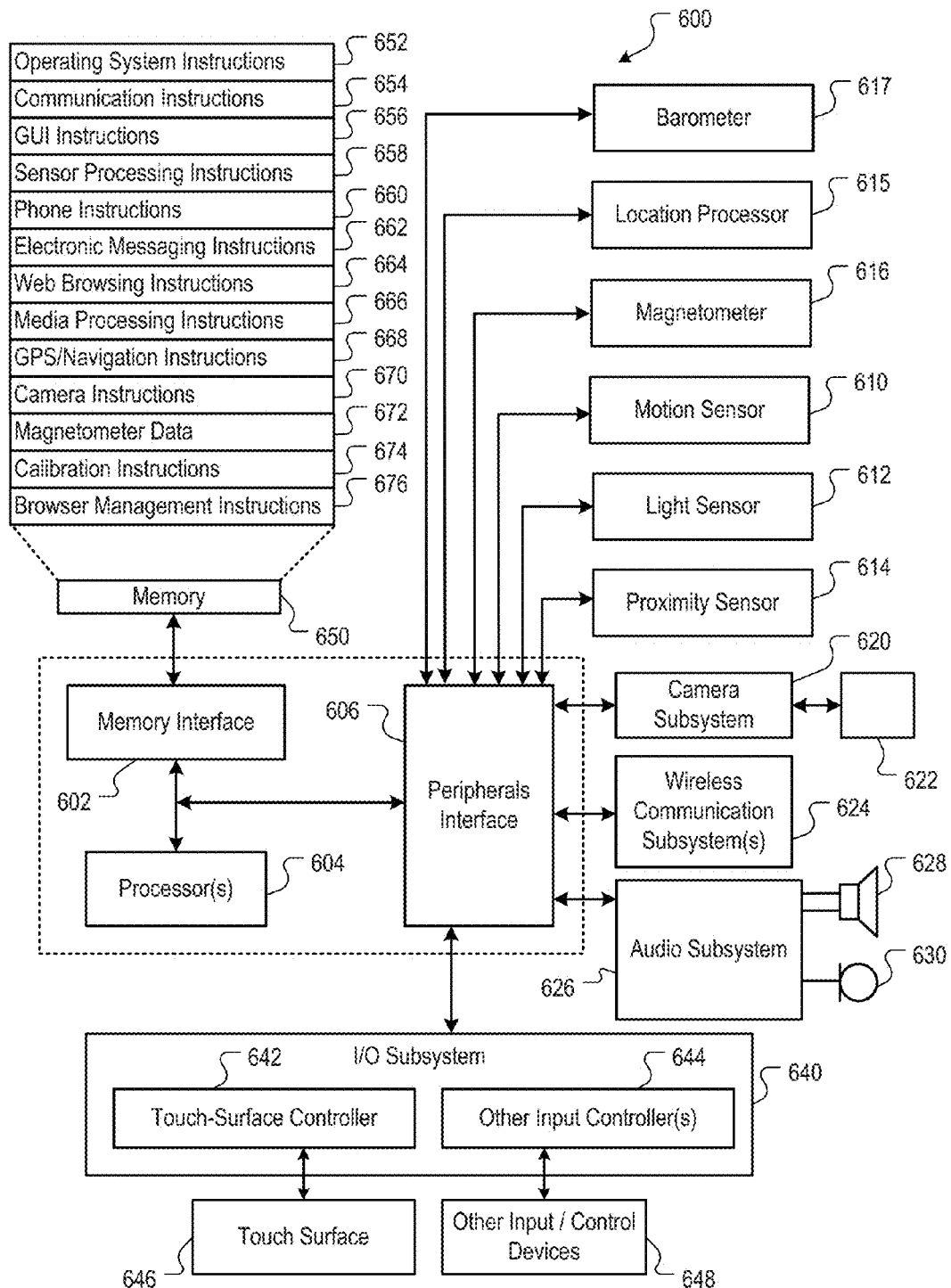
FIG. 6 is a block diagram illustrating an exemplary device architecture of a computing device implementing the features and operations of FIGS. 1-5.

FIG. 6 is a block diagram illustrating exemplary device architecture 600 of computing device 102 implementing the features and operations of FIGS. 1-5. Computing device 102 can be a laptop computer, a tablet computer, a smart phone, or a wearable computing device (e.g., a smart wristwatch). Computing device 102 can include memory interface 602, one or more data processors, image processors and/or processors 604, and peripherals interface 606. Memory interface 602, one or more processors 604 and/or peripherals interface 606 can be separate components or can be integrated in one or more integrated circuits. Processors 604 can include one or more application processors and one or more wireless processors. The various components in computing device 102, for example, can be coupled by one or more communication buses or signal lines.

Sensors, devices, and subsystems can be coupled to peripherals interface 606 to facilitate multiple functionalities. For example, motion sensor 610, light sensor 612, and proximity sensor 614 can be coupled to peripherals interface 606 to facilitate orientation, lighting, and proximity functions of the mobile device. Location processor 615 (e.g., GPS receiver) can be connected to peripherals interface 606 to provide geopositioning. Electronic magnetometer 616 (e.g., an integrated circuit chip) can also be connected to peripherals interface 606 to provide data that can be used to determine the direction of magnetic North. Thus, electronic magnetometer 616 can be used as an electronic compass. Motion sensor 610 can include one or more accelerometers configured to determine change of speed and direction of movement of the mobile device. Barometer 617 can include one or more devices connected to peripherals interface 606 and configured to measure pressure of atmosphere around the mobile device.

Camera subsystem 620 and an optical sensor 622, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which a mobile device is intended to operate. For example, a mobile device can include communication subsystems 624 designed to operate over a GSM network, a GPRS network, an EDGE network, a Wi-Fi™ or WiMax™ network, and a Bluetooth™ network. In particular, the wireless communication subsystems 624 can include hosting protocols such that the mobile device can be configured as a base station for other wireless devices.

Audio subsystem 626 can be coupled to a speaker 628 and a microphone 630 to facilitate voice-enabled functions, such as voice recognition, voice replication, digital recording, and telephony functions. Audio subsystem 626 can be configured to receive voice commands from the user.

I/O subsystem 640 can include touch surface controller 642 and/or other input controller(s) 644. Touch surface controller 642 can be coupled to a touch surface 646 or pad. Touch surface 646 and touch surface controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 646. Touch surface 646 can include, for example, a touch screen.

Other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of speaker 628 and/or microphone 630.

In one implementation, a pressing of the button for a first duration may disengage a lock of the touch surface 646; and a pressing of the button for a second duration that is longer than the first duration may turn power to computing device 102 on or off. The user may be able to customize a functionality of one or more of the buttons. The touch surface 646 can, for example, also be used to implement virtual or soft buttons and/or a keyboard.

In some implementations, computing device 102 can present recorded audio and/or video files, such as MP3, AAC, and MPEG files. In some implementations, computing device 102 can include the functionality of an MP3 player. Computing device 102 may, therefore, include a pin connector that is compatible with the iPod. Other input/output and control devices can also be used.

Memory interface 602 can be coupled to memory 650. Memory 650 can include high-speed random access memory and/or non-volatile memory, such as one or more magnetic disk storage devices, one or more optical storage devices, and/or flash memory (e.g., NAND, NOR). Memory 650 can store operating system 652, such as Darwin, RTXC, LINUX, UNIX, OS X, WINDOWS, iOS, or an embedded operating system such as VxWorks. Operating system 652 may include instructions for handling basic system services and for performing hardware dependent tasks. In some implementations, operating system 652 can include a kernel (e.g., UNIX kernel).

Memory 650 may also store communication instructions 654 to facilitate communicating with one or more additional devices, one or more computers and/or one or more servers. Memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes and functions; camera instructions 670 to facilitate camera-related processes and functions; magnetometer data 672 and calibration instructions 674 to facilitate magnetometer calibration. The memory 650 may also store other software instructions (not shown), such as security instructions, web video instructions to facilitate web video-related processes and functions, and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 650.

Memory 650 can store browser management instructions 676. Browser management instructions can include content pane management instructions that, when executed, cause processor 604 to perform operations of content pane manager 406, including executing procedure 500. Browser management instructions 676 can include page image management instructions that, when executed, cause processor 604 to perform operations of page image manager 408, including executing procedure 520. Browser management instructions 676 can include snapshot management instructions that, when executed, cause processor 604 to perform operations of snapshot manager 410, including executing procedure 540.

Each of the above identified instructions and applications can correspond to a set of instructions for performing one or more functions described above. These instructions need not be implemented as separate software programs, procedures, or modules. Memory 650 can include additional instructions or fewer instructions. Furthermore, various functions of the mobile device may be implemented in hardware and/or in software, including in one or more signal processing and/or application specific integrated circuits.

Exemplary Operating Environment

Figure 7:
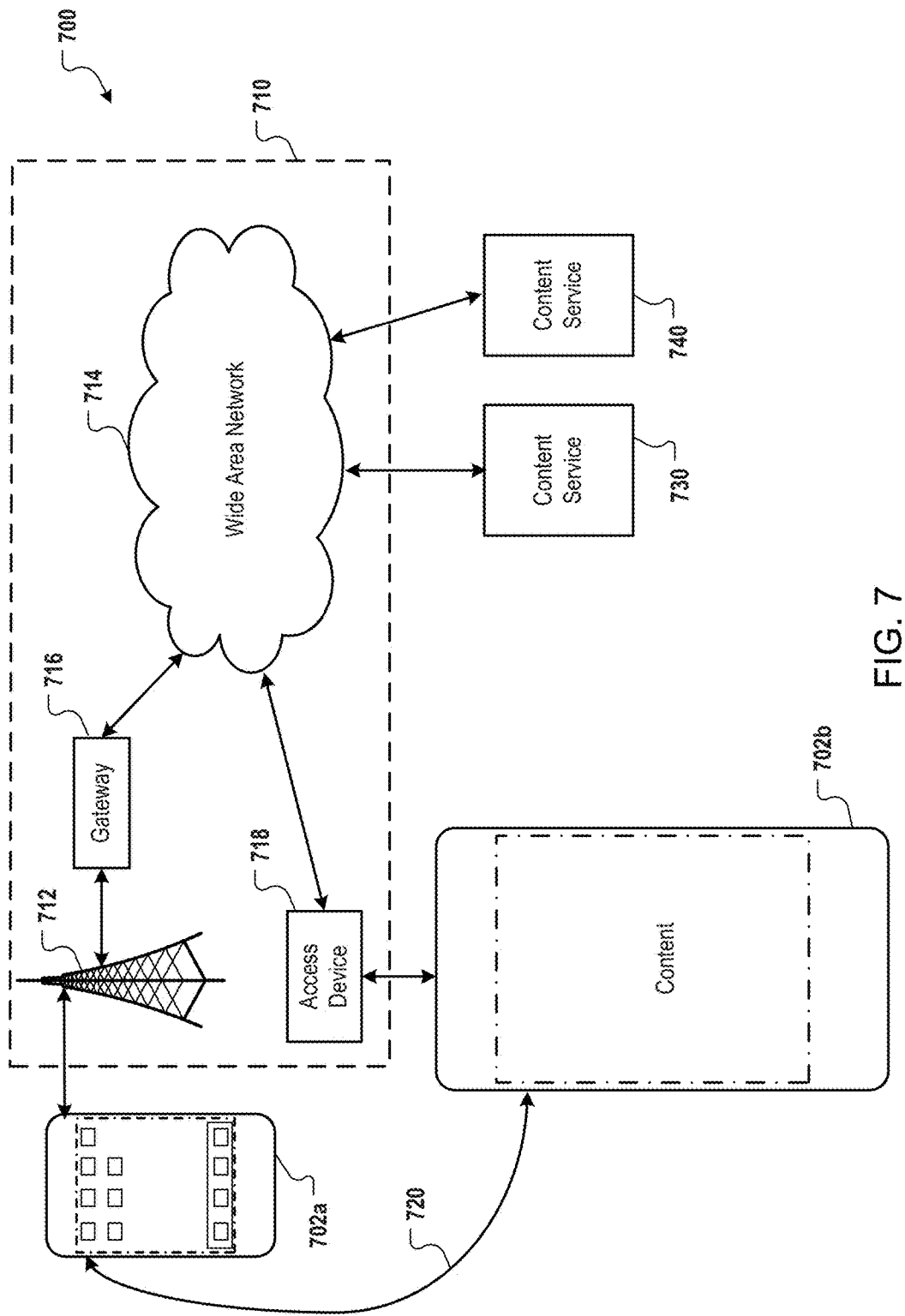
FIG. 7 is a block diagram of an exemplary network operating environment for computing devices implementing the features and operations of FIGS. 1-5.

FIG. 7 is a block diagram of exemplary network operating environment 700 for the computing devices implementing the features and operations of FIGS. 1-5. Each of mobile devices 702a and 702b can be computing device 102. Mobile devices 702a and 702b can, for example, communicate over one or more wired and/or wireless networks 710 in data communication. For example, a wireless network 712, e.g., a cellular network, can communicate with a wide area network (WAN) 714, such as the Internet, by use of a gateway 716. Likewise, an access device 718, such as an 802.11g wireless access point, can provide communication access to the wide area network 714.

In some implementations, both voice and data communications can be established over wireless network 712 and the access device 718. For example, mobile device 702a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 712, gateway 716, and wide area network 714 (e.g., using Transmission Control Protocol/Internet Protocol (TCP/IP) or User Datagram Protocol (UDP)). Likewise, in some implementations, the mobile device 702b can place and receive phone calls, send and receive e-mail messages, and retrieve electronic documents over the access device 718 and the wide area network 714. In some implementations, mobile device 702a or 702b can be physically connected to the access device 718 using one or more cables and the access device 718 can be a personal computer. In this configuration, mobile device 702a or 702b can be referred to as a "tethered" device.

Mobile devices 702a and 702b can also establish communications by other means. For example, wireless mobile device 702a can communicate with other wireless devices, e.g., other mobile devices, cell phones, etc., over the wireless network 712. Likewise, mobile devices 702a and 702b can establish peer-to-peer communications 720, e.g., a personal area network, by use of one or more communication subsystems, such as the Bluetooth™ communication devices. Other communication protocols and topologies can also be implemented.

Mobile device 702a or 702b can, for example, communicate with one or more services 730 and 740 over the one or more wired and/or wireless networks. For example, first content service 730 can serve first content page 326. Second content service 740 can serve, to mobile devices 702a and 702b, a second content page based on which mobile devices 702a and 702b can create snapshot 332.

Mobile device 702a or 702b can also access other data and content over the one or more wired and/or wireless networks. For example, content publishers, such as news sites, Really Simple Syndication (RSS) feeds, web sites, blogs, social networking sites, developer networks, etc., can be accessed by mobile device 702a or 702b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention.

What is claimed is:

1. A method comprising:
   at a computing device including one or more processors, non-transitory memory, and a touch-sensitive display:
   displaying a plurality of content panes in a visual stack in a first order in a depth dimension on the touch-sensitive display, the plurality of content panes includes a first content pane and a second content pane, the first order includes the first content pane appearing positioned in front of the second content pane and partially obscuring the second content pane, wherein a distance in the depth dimension appears to separate the first content pane and the second content pane;

detecting a first touch gesture on the touch-sensitive display that includes detecting a first contact on a portion of the second content pane not obscured by the first content pane, and detecting movement of the first contact to a position on the touch-sensitive display that appears to be in front of the first content pane; and in response to detecting the movement of the first contact to the position on the touch-sensitive display that appears to be in front of the first content pane, switching positions of the first content pane and the second content pane in an animated motion so that the plurality of content panes is displayed in the visual stack in a second order on the touch-sensitive display, wherein:

the second order includes the second content pane appearing positioned in front of the first content pane and partially obscuring the first content pane; and in the animated motion, the first content pane appears to move toward a bottom edge of the touch-sensitive display in the depth dimension, the second content pane appears to move forward in the depth dimension to occupy a position occupied by the first content pane before the first touch gesture was detected on the touch-sensitive display, and the first content pane appears to move backward in the depth dimension to occupy a position occupied by the second content pane before the first touch gesture was detected on the touch-sensitive display.

2. The method of claim 1, further comprising, after switching the positions:

while the plurality of content panes is displayed in the visual stack in the second order on the touch-sensitive display, detecting a second touch gesture on the touch-sensitive display that including detecting a second contact on a portion of the second content pane and detecting movement of the second contact to a position on the touch-sensitive display that appears to be behind the first content pane; and in response to detecting the movement of the second contact to the position on the touch-sensitive display that appears to be behind the first content pane, switching positions of the second content pane and the first content pane in a second animated motion so that the plurality of content panes is displayed in the visual stack in the first order on the touch-sensitive display, wherein, in the second animated motion, the second content pane appears to move toward the bottom edge of the touch-sensitive display in the depth dimension, the second content pane appears to move backward in the depth dimension to occupy the position occupied by the second content pane before the first touch gesture was detected on the touch-sensitive display, and the first content pane appears to move forward in the depth dimension to occupy the position occupied by the first content pane before the first touch gesture was detected on the touch-sensitive display so that the first content pane obscures a portion of the second content pane.

3. The method of claim 1, wherein:
each of the first content pane and the second content pane is a web page or a snapshot of a web page, the snapshot being an image of the web page.

4. The method of claim 1, further comprising:
detecting a deletion gesture input on the touch-sensitive display, the deletion gesture input includes a second contact on a portion of one of the first content pane or the second content pane not obscured by the first content pane and a sideways movement of the second contact on the touch-sensitive display; and in response to detecting the sideways movement of the second contact, ceasing display of one of the first content pane or the second content pane from the touch-sensitive display, wherein ceasing to display one of the first content pane or the second content pane including displaying an animation in which one of the first content pane or the second content pane slides off from the touch-sensitive display according to a direction of the sideways movement of the second contact.

5. The method of claim 1, wherein the first content pane and the second content pane are arranged to have an appearance that a vertical edge of the first content pane and a vertical edge of the second content pane point to a horizontal axis below the first content pane and the second content pane, wherein the horizontal axis is a visible axis displayed on the touch-sensitive display or an invisible axis defined by display perspectives of the first content pane and the second content pane.

6. The method of claim 5, further comprising:
detecting a pushback gesture input on the touch-sensitive display, the pushback gesture input includes a second contact on at least one of the first content pane or the second content pane not obscured by the first content pane and an upward movement of the second contact on the touch-sensitive display; and in response to detecting the upward movement of the second contact on the touch-sensitive display, animating a rotation of the first content pane and second content pane around the horizontal axis, including reducing a size of the first content pane and the second content pane and changing display perspectives of the first content pane and the second content pane to have an appearance of moving away from a viewer.

7. The method of claim 1, further comprising:
detecting a new content pane input on the touch-sensitive display for adding a new content pane to the plurality of content panes in the visual stack; and in response to detecting the new content pane input, adding the new content pane to the plurality of content panes in the visual stack in front of both the first content pane and the second content pane in an animation.

8. The method of claim 1, further comprising:
detecting a tilt input that corresponds to tilting the touch-sensitive display to a position where a distance between a first vertical edge of the touch-sensitive display and a viewer is greater than a distance between a second vertical edge of the touch-sensitive display to a viewer; and in response to detecting the tilt input, changing an apparent plane of the first content pane and an apparent plane of the second content pane to simulate a three-dimensional visual effect the tilt.

9. A computing device comprising:
one or more processors;
a touch-sensitive display; and a non-transitory computer-readable storage medium coupled to the computing device, the non-transitory computer-readable storage medium storing computer instructions operable to cause the computing device to perform operations comprising:

displaying a plurality of content panes in a visual stack in a first order in a depth dimension on the touch-sensitive display, the plurality of content panes includes a first content pane and a second content pane, the first order includes the first content pane appearing positioned in front of the second content pane and partially obscuring the second content pane, wherein a distance in the depth dimension appears to separate the first content pane and the second content pane;

detecting a first touch gesture on the touch-sensitive display that includes detecting a first contact on a portion of the second content pane not obscured by the first content pane, and detecting movement of the first contact to a position on the touch-sensitive display that appears to be in front of the first content pane; and in response to detecting the movement of the first contact to the position on the touch-sensitive display that appears to be in front of the first content pane, switching positions of the first content pane and the second content pane in an animated motion so that the plurality of content panes is displayed in the visual stack in a second order on the touch-sensitive display, wherein:

the second order includes the second content pane appearing positioned in front of the first content pane and partially obscuring the first content pane; and in the animated motion, the first content pane appears to move toward a bottom edge of the touch-sensitive display in the depth dimension, the second content pane appears to move forward in the depth dimension to occupy a position occupied by the first content pane before the first touch gesture was detected on the touch-sensitive display, and the first content pane appears to move backward in the depth dimension to occupy a position occupied by the second content pane before the first touch gesture was detected on the touch-sensitive display.

10. The system of claim 9, wherein the instructions further cause the computing device to perform operations comprising, after switching the positions:

while the plurality of content panes is displayed in the visual stack in the second order on the touch-sensitive display, detecting a second touch gesture on the touch-sensitive display that including detecting a second contact on a portion of the second content pane and detecting movement of the second contact to a position on the touch-sensitive display that appears to be behind the first content pane; and in response to detecting the movement of the second contact to the position on the touch-sensitive display that appears to be behind the first content pane, switching positions of the second content pane and the first content pane in a second animated motion so that the plurality of content panes is displayed in the visual stack in the first order on the touch-sensitive display, wherein, in the second animated motion, the second content pane appears to move toward the bottom edge of the touch-sensitive display in the depth dimension, the second content pane appears to move backward in the depth dimension to occupy the position occupied by the second content pane before the first touch gesture was detected on the touch-sensitive display, and the first content pane appears to move forward in the depth dimension to occupy the position occupied by the first content pane before the first touch gesture was detected on the touch-sensitive display so that the first content pane obscures a portion of the second content pane.

11. The system of claim 9, wherein:
each of the first content pane and the second content pane is a web page or a snapshot of a web page, the snapshot being an image of the web page.

12. The system of claim 9, wherein the instructions further cause the computing device to perform operations comprising:

detecting a deletion gesture input on the touch-sensitive display, the deletion gesture input includes a second contact on a portion of one of the first content pane or the second content pane not obscured by the first content pane and a sideways movement of the second contact on the touch-sensitive display; and in response to detecting the sideways movement of the second contact, ceasing display of one of the first content pane or the second content pane from the touch-sensitive display, wherein ceasing to display one of the first content pane or the second content pane including displaying an animation in which one of the first content pane or the second content pane slides off from the touch-sensitive display according to a direction of the sideways movement of the second contact.

13. The system of claim 9, wherein the first content pane and the second content pane are arranged to have an appearance that a vertical edge of the first content pane and a vertical edge of the second content pane point to a horizontal axis below the first content pane and the second content pane, wherein the horizontal axis is a visible axis displayed on the touch-sensitive display or an invisible axis defined by display perspectives of the first content pane and the second content pane.

14. The system of claim 13, wherein the instructions further cause the computing device to perform operations comprising:

detecting a pushback gesture input on the touch-sensitive display, the pushback gesture input includes a second contact on at least one of the first content pane or the second content pane not obscured by the first content pane and an upward movement of the second contact on the touch-sensitive display; and in response to detecting the upward movement of the second contact on the touch-sensitive display, animating a rotation of the first content pane and second content pane around the horizontal axis, including reducing a size of the first content pane and the second content pane and changing display perspectives of the first content pane and the second content pane to have an appearance of moving away from a viewer.

15. The system of claim 9 wherein the instructions further cause the computing device to perform operations comprising:

detecting a new content pane input on the touch-sensitive display for adding a new content pane to the plurality of content panes in the visual stack; and in response to detecting the new content pane input, adding the new content pane to the plurality of content panes in the visual stack in front of both the first content pane and the second content pane in an animation.

16. The system of claim 9, wherein the instructions further cause the computing device to perform operations comprising:
- detecting a tilt input that corresponds to tilting the touch-sensitive display to a position where a distance between a first vertical edge of the touch-sensitive display and a viewer is greater than a distance between a second vertical edge of the touch-sensitive display to a viewer; and
- in response to detecting the tilt input, changing an apparent plane of the first content pane and an apparent plane of the second content pane to simulate a three-dimensional visual effect the tilt.

17. A non-transitory computer-readable storage medium coupled to a computing device with one or more processors and a touch-sensitive display, the non-transitory computer-readable storage medium storing computer instructions operable to cause the computing device to perform operations comprising:
- displaying a plurality of content panes in a visual stack in a first order in a depth dimension on the touch-sensitive display, the plurality of content panes includes a first content pane and a second content pane, the first order includes the first content pane appearing positioned in front of the second content pane and partially obscuring the second content pane, wherein a distance in the depth dimension appears to separate the first content pane and the second content pane;
- detecting a first touch gesture on the touch-sensitive display that includes detecting a first contact on a portion of the second content pane not obscured by the first content pane, and detecting movement of the first contact to a position on the touch-sensitive display that appears to be in front of the first content pane; and
- in response to detecting the movement of the first contact to the position on the touch-sensitive display that appears to be in front of the first content pane, switching positions of the first content pane and the second content pane in an animated motion so that the plurality of content panes is displayed in the visual stack in a second order on the touch-sensitive display, wherein:
  - the second order includes the second content pane appearing positioned in front of the first content pane and partially obscuring the first content pane; and
  - in the animated motion, the first content pane appears to move toward a bottom edge of the touch-sensitive display in the depth dimension, the second content pane appears to move forward in the depth dimension to occupy a position occupied by the first content pane before the first touch gesture was detected on the touch-sensitive display, and the first content pane appears to move backward in the depth dimension to occupy a position occupied by the second content pane before the first touch gesture was detected on the touch-sensitive display.

18. The method of claim 1, wherein the plurality of content panes also includes a third content pane, and wherein the second content pane is positioned between the first content pane and the third content pane in the depth dimension while the visual stack is displayed in the first order.

19. The method of claim 18, wherein the first content pane is positioned between the second content pane and the third content pane in the depth dimension while the visual stack is displayed in the second order.

20. The method of claim 1, wherein the animated motion further includes temporarily ceasing to display the first content pane while the first content pane moves backward in the depth dimension in order to simulate the first content pane ducking under the second content pane.

\* \* \* \* \*